US005590094A

United States Patent [19]

Inanaga et al.

[11] Patent Number: 5,590,094

[45] Date of Patent: Dec. 31, 1996

[54] SYSTEM AND METHD FOR REPRODUCING SOUND

[75] Inventors: Kiyofumi Inanaga, Kanagawa; Yuji Yamada, Tokyo, both of Japan

[73] Assignee: Sony Corporation, Tokyo, Japan

[21] Appl. No.: 298,818

[22] Filed: Aug. 31, 1994

Related U.S. Application Data

[62] Division of Ser. No. 980,836, Nov. 24, 1992, Pat. No. 5,367,506.

[30] Foreign Application Priority Data

Nov. 25, 1991 [JP] Japan .................................... 3-335623

[51] Int. Cl.[6] ...................................................... H04B 1/20

[52] U.S. Cl. .................................... 369/4; 381/92; 381/2; 360/5

[58] Field of Search .............................. 369/4, 5, 86, 91, 369/92, 49; 360/4, 5, 7, 22, 23, 24; 381/2, 26, 92; 84/461, 462

[56] References Cited

U.S. PATENT DOCUMENTS

| | | | |
|---|---|---|---|
| 2,844,663 | 7/1958 | Friess | 369/4 |
| 4,251,688 | 2/1981 | Furner | 179/1 |
| 4,741,038 | 4/1988 | Elko et al. | 381/92 |
| 4,752,961 | 6/1988 | Kahn | 381/92 |
| 4,802,227 | 1/1989 | Elko et al. | 381/92 |
| 5,046,097 | 9/1991 | Lowe et al. | 381/17 |
| 5,208,860 | 5/1993 | Lowe et al. | 381/17 |
| 5,440,639 | 8/1995 | Suzuki et al. | 381/17 |

FOREIGN PATENT DOCUMENTS

| | | | |
|---|---|---|---|
| 2847603 | 5/1980 | Germany | 369/4 |
| 56-083803 | 7/1981 | Japan | 369/4 |
| 1-276837 | 11/1989 | Japan . | |
| 2151439 | 7/1985 | United Kingdom . | |

*Primary Examiner*—Tan Dinh
*Attorney, Agent, or Firm*—Lise A. Rode, Esq.; Jerry A. Miller; Pasquale Musacchio, Esq.

[57] ABSTRACT

A sound collecting system and a sound reproducing apparatus by means of which an actual audio image can be reproduced. The sound collecting system includes a plurality of microphones for producing sound signals and a plurality of position detecting apparatus for detecting locations of the microphones and/or positions of sound sources to produce position signals. The sound signals and the position signals are multiplexed by a plurality of multiplexers, and the multiplexed signals are stored into respective audio channels or different channels by a signal recording apparatus. The multiplexing may be performed by a frequency multiplexing method, a time division multiplexing method or the like. Since also position information is stored into corresponding audio channels together with acoustic sound signals, at the reproducing stage, reproduction is possible taking the positions into consideration and an actual audio image can be produced. Also dimensions, directivities and so forth of the sound sources can be multiplexed in addition to the position information.

9 Claims, 6 Drawing Sheets

SYSTEM AND METHD FOR REPRODUCING SOUND

This application is a divison of application number 07/980,836, filed Nov. 24, 1992 and now is U.S. Pat. No. 5,367,506.

BACKGROUND OF THE INVENTION

1. Field of the Invention

This invention relates to a method and system reproducing collected sound, and particularly to a sound reproducing system and method by which original sound can be reproduced as truly as possible as an actual audio image.

2. Description of the Related Art

Various sound collecting systems and sound reproducing systems have been proposed and attempted regarding how to truly reproduce sound such as acoustic sound or voice having a spatial extent.

Particularly, reproduction of acoustic sound higher in truth is demanded for a three-dimensional television system together with three-dimensional reproduction of an image.

For example, the intensity stereo system which is a popular sound collecting and reproducing method involves collection of sounds using a large number of microphones, and recording of the thus collected sounds together with additional information such as level differences or time differences divisionally into a predetermined plurality of channels, for example, into N channels. Then, upon reproduction of the recorded sound, an audio image is produced by means of N loudspeakers disposed at predetermined positions.

Also the binaural sound collecting and reproducing system and the one-point sound collecting and reproducing system are known.

Since such conventional sound collecting and reproducing systems as represented by the exemplary systems described above all reproduce a virtual audio image, the original object of producing an actual audio image cannot be achieved as yet.

As a result, there still remain problems arising from a virtual audio image, for example, the problem that the reproduction position of sound is limited and an image of sound is not formed at a position displaced from a particular position and consequently the feeling of substance is lost toward the position of the virtual audio image.

Generally speaking, in production of an actual audio image, not only sound collection or reproduction but also general conditions from the sound collecting step to the reproducing step must naturally be taken into consideration. To this end, attention must be paid to the method of recording collected sounds, the editing method and so forth.

SUMMARY OF THE INVENTION

It is an object of the present invention to provide a sound reproducing system by means of which an actual audio image can be produced.

According to an aspect of the present invention, there is provided a sound reproducing system, which comprises means for reading out, from a plurality of audio channels which are independent of each other and in which audio signals as well as position signals of positions of sound sources of the audio signals and/or locations of sound detecting means are recorded in a multiplexed condition, the audio signals and the position signals, means for synthetically adjusting the amplitudes and the delay times of the audio signals read out by the reading out means in order to produce an actual audio image in accordance with the position signals read out by the reading out means, and loudspeaker means for outputting the audio signals adjusted by the adjusting means as acoustic sound.

According to a further aspect of the present invention, there is provided a sound reproducing system, which comprises means for reading out, from a plurality of audio channels which are independent of each other and in which audio signals as well as position signals of positions of sound sources of the audio signals and/or locations of sound detecting means and dimension signals of dimensions of the sound sources are recorded in a multiplexed condition, the audio signals, the position signals and the dimension signals, means for synthetically adjusting the amplitudes and the delay times of the audio signals read out by the reading out means in order to produce an actual audio image in accordance with the position signals and the dimension signals read out by the reading out means, and loudspeaker means for outputting the audio signals adjusted by the adjusting means as acoustic sound.

According to a still further aspect of the present invention, there is provided a sound reproducing system, which comprises means for reading out, from a plurality of audio channels which are independent of each other and in which audio signals as well as position signals of positions of sound sources of the audio signals and/or locations of sound detecting means, dimension signals of dimensions of the sound sources and directivity signals of directivities of the sound sources and the sound detecting means are recorded in a multiplexed condition, the audio signals, the position signals, the dimension signals and the directivity signals, means for synthetically adjusting the amplitudes and the delay times of the audio signals read out by the reading out means in order to produce an actual audio image in accordance with the position signals, the dimension signals and the directivity signals read out by the reading out means, and loudspeaker means for outputting the audio signals adjusted by the adjusting means as acoustic sound.

According to a yet further aspect of the present invention, there is provided a sound collecting method, which comprises the steps of detecting a plurality of sounds from a plurality of respective sound sources to produce sound signals, detecting positions of the sound sources and/or locations of a plurality of sound detecting means to produce position signals, and multiplexing and recording the sound signals and the position signals at a time into a plurality of audio channels which are independent of each other.

According to a yet further aspect of the present invention, there is provided a sound reproducing method, which comprises the steps of reading out, from a plurality of audio channels which are independent of each other and in which audio signals as well as position signals of positions of sound sources of the audio signals and/or locations of sound detecting means are recorded, the audio signals and the position signals, synthetically adjusting the amplitudes and the delay times of the audio signals thus read out in order to produce an actual audio image in accordance with the position signals thus read out, and outputting the audio signals thus adjusted as acoustic sound.

According to a yet further aspect of the present invention, there is provided a sound reproducing system, which comprises means for reading out, from a channel in which audio signals are recorded in a multiplexed condition, the audio signal and for reading out, from another channel in which position signals of positions of sound sources of the audio signals and/or locations of sound detecting means are recorded in a multiplexed condition, the position signals, means for synthetically adjusting the amplitudes and the delay times of the audio signals read out by the reading out means in order to produce an actual audio image in accordance with the position signals read out by the reading out means, and loudspeaker means for outputting the audio signals adjusted by the adjusting means as acoustic sound.

According to a yet further aspect of the present invention, there is provided a sound reproducing system, which comprises means for reading out, from a channel in which audio signals are recorded in a multiplexed condition, the audio signal and for reading out, from another channel in which position signals of positions of sound sources of the audio signals and/or locations of sound detecting means and dimension signals of dimensions of the sound sources are recorded in a multiplexed condition, the position signals and the dimension signals, means for synthetically adjusting the amplitudes and the delay times of the audio signals read out by the reading out means in order to produce an actual audio image in accordance with the position signals and the dimension signals read out by the reading out means, and loudspeaker means for outputting the audio signals adjusted by the adjusting means as acoustic sound.

According to a yet further aspect of the present invention, there is provided a sound reproducing system, which comprises means for reading out, from a channel in which audio signals are recorded in a multiplexed condition, the audio signal and for reading out, from another channel in which position signals of positions of sound sources of the audio signals and/or locations of sound detecting means, dimension signals of dimensions of the sound sources and directivity signals of directivities of the sound sources and directivities of the sound detecting means are recorded in a multiplexed condition, the position signals, the dimension signals and the directivity signals, means for synthetically adjusting the amplitudes and the delay times of the audio signals read out by the reading out means in order to produce an actual audio image in accordance with the position signals, the dimension signals and the directivity signals read out by the reading out means, and loudspeaker means for outputting the audio signals adjusted by the adjusting means as acoustic sound.

According to a yet further aspect of the present invention, there is provided a sound reproducing method, which comprises the steps of reading out, from a plurality of channels which are independent of each other and in which audio signals as well as position signals of positions of sound sources of the audio signals and/or locations of sound detecting means are recorded, the audio signals and the position signals, synthetically adjusting the amplitudes and the delay times of the audio signals thus read out in order to produce an actual audio image in accordance with the position signals thus read out, and outputting the audio signals thus adjusted as acoustic sound.

Since the sound signals and the positional relationships of them correspond to each other, at the editing stage and the reproducing stage of the sound signals, edition and reproduction of the sounds to produce an actual audio image can be performed taking the positional relationships of the sound sources and the locations of the sound detecting means into consideration.

Particularly, since the channel in which the sound signals are multiplexed and the channel in which the position signals are multiplexed are separate from each other, handling of signals in an editing operation or a reproducing operation, which is performed as after processing, is facilitated.

The production of an actual audio image becomes further accurate if signals of dimensions of the sound sources are additionally multiplexed and recorded.

The multiplexed dimension signals of the sound sources is only required to be recorded into a channel different from the channel into which the sound signals are recorded. Thus, the dimension signals may be recorded into the channel into which the position information is multiplexed and recorded. Since normally a position signal varies continuously, it involves a comparatively large amount of information, but the variation of a position is moderate and dimensions of a sound source presents a less variation. Accordingly, if the channel or channels for the position information and the dimension information are made different from the channel for the sound signals, then this is convenient from the point of view of signal processing.

If directivities of the sound sources and directivities of the sound detecting means are multiplexed and recorded further additionally, then the production of an actual audio image can be realized further accurately. The channel into which the directivities are to be multiplexed and recorded must only be required to be different from the channel into which the sound signals are multiplexed and recorded.

With the sound reproducing systems and methods of the present invention, an actual audio image is produced in accordance with position signals as well as sound source dimension signals and directivity signals read out from individual channels described above.

Further, since reproduction of sound is performed using the plurality of loudspeakers in accordance with read-out signals, which have been collected and multiplexed and recorded into individual audio channels by the sound collecting system and method of the present invention, an actual audio image can be produced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
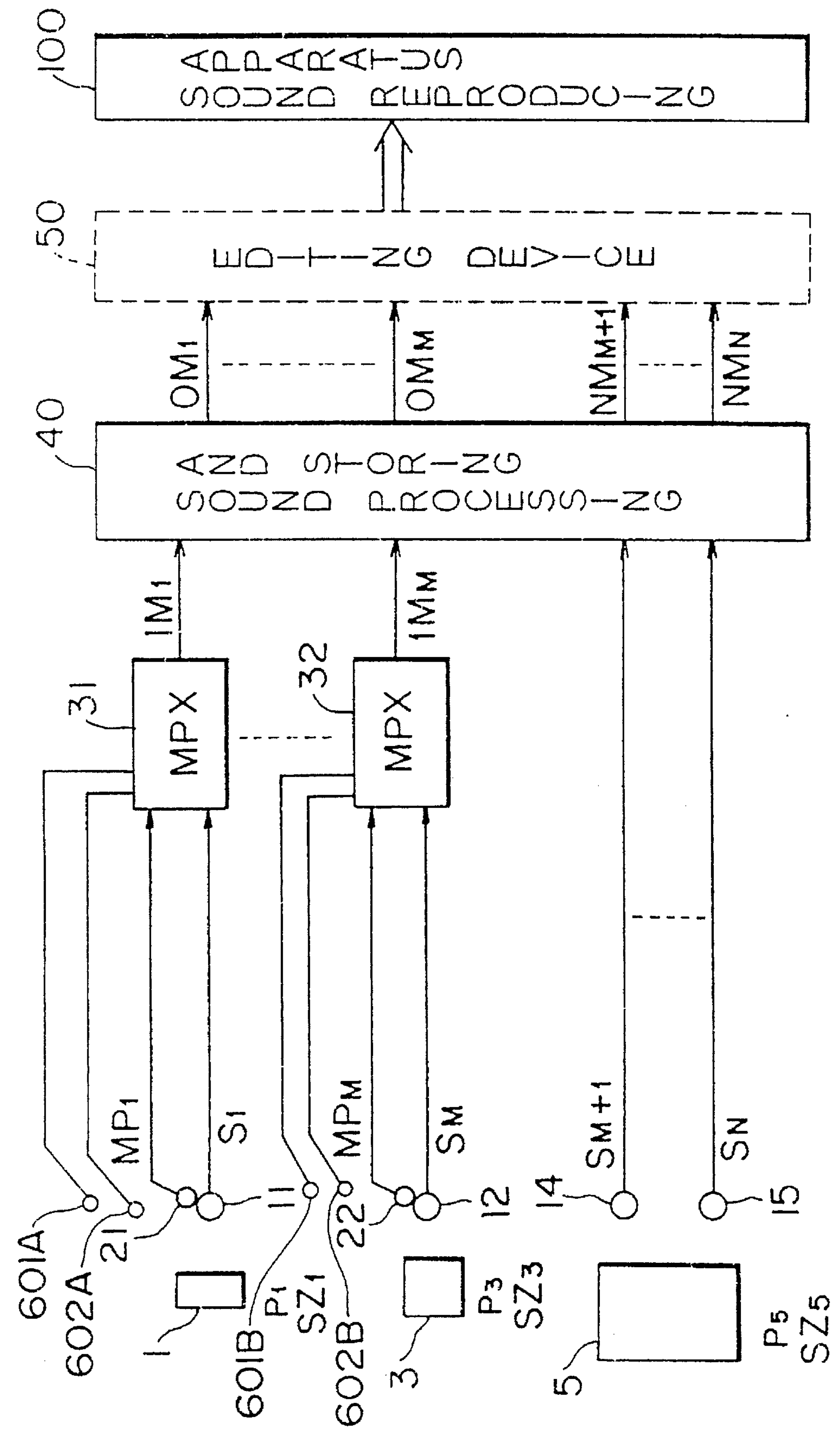
FIG. 1 is a block diagram of a sound collecting apparatus to which the present invention is applied.

Referring first to FIG. 1, there is shown a sound collecting apparatus to which the present invention is applied. The sound collecting apparatus shown in FIG. 1 will be described in connection with, for example, a case wherein raw sound collection of a musical performance in a concert hall is performed.

Generally speaking, in processing of sound, conditions at individual processing steps are determined back from the point of view of how an actual audio image can possibly be produced taking as a whole a series of pertinent matters such as, for example, sound collecting conditions such as positions and magnitudes of sound sources which make subjects for sound collection and reproduction such as play sound of a concert or sound of engines in an automobile race place and positions, sensitivity characteristics, directivities and so forth of sound collecting microphones, conditions of an editing method and an apparatus therefor, a reproducing method, performances of apparatus used for audio processing and so forth.

The present sound collecting apparatus collects sound in such a manner as to allow an actual audio image to be reproduced taking such edition and reproduction of sounds from a plurality of sound sources into consideration.

The sound collecting apparatus shown in FIG. 1 collects sounds from various sound sources including sounds from a plurality of musical instruments such as a piano 1 and a plurality of violins (only one is shown in FIG. 1) 3 and sounds from the audience of a concert hole 5.

The sound collecting apparatus shown in FIG. 1 includes a first microphone 11 for detecting an acoustic sound from the piano 1, second to Mth microphones (only one is shown in FIG. 1) 12 for detecting acoustic sounds from the violins 3, and (M+1)th to Nth microphones 14 to 15 for detecting acoustic sounds from the hall 5.

The sound collecting apparatus further includes a first position detecting apparatus 21 for providing information representative of the position of the first microphone 11 and second to Mth position detecting apparatus (only one is shown in FIG. 1) 22 for providing information representative of the positions of the second to Mth microphones 12.

The sound collecting apparatus further includes a first multiplexer 31, a plurality of (M−1) second multiplexers 32 and a collected sound signal processing and storing apparatus 40.

The first microphone 11 is disposed in the proximity of the piano 1, detects an acoustic sound principally from the piano 1, and outputs the detected acoustic sound to the first multiplexer 31.

Similarly, the second to Mth microphones 12 are disposed in the proximity of the violins 3 and detect acoustic sounds principally from the violins 3.

The first position detecting apparatus 21 outputs information of the position of the piano 1, and the second to Mth position detecting apparatus 22 individually output information of the positions of the violins 3.

The position information provided from the first position detecting apparatus 21 and the second to Mth position detecting apparatus 22 represents relative positions or absolute positions on a rectangular coordinate system wherein, for example, the position of the conductor in the concert hall 5 is set as the origin. However, the position information need not necessarily be represented in rectangular coordinates but may be represented in a polar coordinate system.

The musical instruments such as the piano 1 and the violins 3 in the concert hall are normally disposed at fixed positions in the concert hall 5. Accordingly, in the present sound collecting apparatus, the first position detecting apparatus 21 and the second to Mth position detecting apparatus 22 provide fixed location signals of the piano 1 and the violins 3.

Position information of acoustic sounds from the audience in the concert hall 5 is set as position information of the entire hall 5 to the collected sound signal processing and storing apparatus 40.

The first multiplexer 31 multiplexes a microphone detected sound signal S1 detected by the first microphone 11 and a microphone position information detection signal MP1 from the first position detecting apparatus 21.

Similarly, each of the second multiplexers 32 multiplexes a microphone detected sound signal S2 to SM from a corresponding one of the second to Mth microphones 12 and a microphone position information detection signal MP2 to MPM from a corresponding one of the second to Mth position detecting apparatus 22.

The thus multiplexed signals are inputted as input multiplexed signals IM1 to IMM to the collected sound signal processing and storing apparatus 40 and then recorded at the positions corresponding to individual audio channels.

In this manner, a microphone detected sound signal S and a corresponding microphone position information detection signal MP are recorded in a multiplexed condition into a same audio channel.

As a multiplexing method of an audio signal and a position signal by the first multiplexer 31 and the second multiplexers 32, it is performed, for example, by a frequency multiplexing method suitable for analog signal processing, a time division multiplexing method suitable for digital signal processing or the like.

Figure 2:
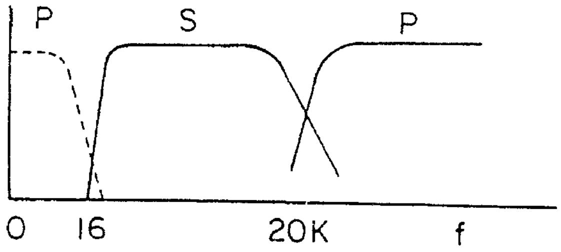
FIG. 2 is a diagram illustrating frequency multiplexing processing for an acoustic sound signal and position information by the sound collecting apparatus shown in FIG. 1.

A frequency multiplexing method will be described with reference to FIG. 2.

As well known, the frequency band of audible sound is about 16 HZ (or about 20 HZ) to about 2,000 HZ. The frequency band is used for multiplexing of a microphone detected sound signal S, and another frequency band outside the frequency band is used for multiplexing of a microphone position information detection signal MP. As a frequency band for a microphone position information detection signal P, either a frequency band which is lower than the frequency 16HZ as indicated by a broken line or another frequency band which is higher than 2,000 HZ as indicated by a solid line is employed.

Figure 3:
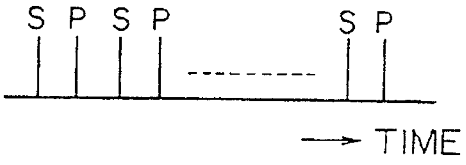
FIG. 3 is a diagram illustrating time base multiplexing processing for an acoustic sound signal and position information by the sound collecting apparatus shown in FIG. 1.

Time division multiplexing processing will be described with reference to FIG. 3. A microphone detected sound signal S and a microphone position information detection signal P therefor are divided in a time series relationship and multiplexed for each of a plurality of audio channels.

While time division multiplexing in which digital processing is performed is easy as multiplexing at the first multiplexer 31 and the second multiplexers 32, if also the factor of a price is taken into consideration, then it is rather difficult to perform frequency multiplexing individually on the first multiplexer 31 and the second multiplexers 32. Accordingly, when frequency multiplexing is to be performed, a microphone detected sound signal S and a microphone position information detection signal MP may be inputted once to the collected sound signal processing and storing apparatus 40 so as to frequency multiplex them in the collected sound signal processing and storing apparatus 40.

Or, time division multiplexing processing may be performed in the collected sound signal processing and storing apparatus 40.

Anyway, an acoustic sound signal and a corresponding position signal are multiplexed for each audio channel and outputted as output multiplexed signals OM1 to OMM from the collected sound signal processing and storing apparatus 40.

In the present sound collecting apparatus, M channels from among the totaling N audio channels are used as the multiplexed signals, and the remaining N-M channels are outputted as non-multiplexed signals from the collected sound signal processing and storing apparatus 40.

Accordingly, the collected sound signal processing and storing apparatus 40 receives microphone detected sound signals SM+1 to SN of the (M+1)th microphone 14 to the Nth microphone 15 and outputs them as they are without multiplexing them.

Those M+1th microphone 14 to Nth microphone 15 are disposed, in the present sound collecting apparatus, at various locations and detect acoustic sounds of the entire audience in the concert hall 5. While those acoustic sounds are normally used in order to provide the presence, they are not particularly related to position information but are used as background sounds.

Recording into N audio channels by the collected sound signal processing and storing apparatus 40 is performed such that storing is performed for each independent audio channel into various record media such as, for example, recording onto a magnetic tape, recording onto an optical disk or recording into a semiconductor memory.

A stored signal for each audio channel stored into a record medium by the collected sound signal processing and storing apparatus 40 is edited with an editing apparatus 50 when necessary and is reproduced by a sound reproducing apparatus 100.

In editing processing with the editing apparatus 50, since a sound signal and a position signal are stored in a multiplexed condition for each audio channel, a sound editing operation which involves spatial signal processing can be performed.

Further, it is also possible to reproduce, without performing an editing operation, audio information including position information stored by the sound collecting apparatus described above, directly with the sound reproducing apparatus 100.

Or else, it is also possible to output, without storing into a storage medium with the collected sound signal processing and storing apparatus 40, a multiplexed signal and a non-multiplexed signal of audio information and position information for each audio channel directly to the sound reproducing apparatus 100 so that the signals may be reproduced directly by the sound reproducing apparatus 100.

The reproducing processing of the sound reproducing apparatus 100 will be hereinafter described.

In the sound collecting apparatus described above, if dimensions (sizes) of the sound sources such as the piano 1, the violins 3 and the concert hall 5 are multiplexed in addition to microphone detected sound signals S and microphone position information detection signals MP, then the information becomes richer, which is preferable for information editing processing and reproduction to form an actual audio image.

Further, it is preferable in editing processing and reproduction to multiplex directivities of the piano 1, the violins 3 and so forth or directivities of the first microphone 11, the second to Mth microphones 12 and so forth in addition to the microphone detected sound signals S, the microphone position information detection signal MP and the sizes of the sound sources described above, similarly as in the addition of the dimensions of the sound sources.

As regards provision of position information of the first position detecting apparatus 21 and the second to Mth position detecting apparatus 22, in addition to provision of the positions of the sound sources as position information, also locations of the first microphone 11 and the second to Mth microphones 12 are provided. Or, as the position information, locations of the first position detecting apparatus 21 and the second to Mth position detecting apparatus 22 are provided as position information.

By storing accurate position information together with sound information in this manner, it becomes possible to form a further accurate actual audio image by way of editing processing and reproducing processing.

In the present sound collecting apparatus, collection of sound is performed in the concert hall 5, and the piano 1, the violins 3 and so forth are located at fixed positions while also the locations of the first microphone 11 and the second to Mth microphones 12 are fixed.

Accordingly, in the present sound collecting apparatus, position information representative of the relationship of the locations described above may be set in advance to the collected sound signal processing and storing apparatus 40 without using the first position detecting apparatus 21 and the Mth position detecting apparatus 22. Thus, the first position detecting apparatus 21 and the second to Mth position detecting apparatus 22 may not be provided.

However, at the collected sound signal processing and storing apparatus 40, the set position information described above is superimposed on microphone detected sound signals S from the first microphone 11 and the second to Mth microphones 12.

Since the position information is fixed, the superimposing method of the position information may not involve normal multiplexing, but the position information may be stored at a head portion of each audio channel.

Figure 4:
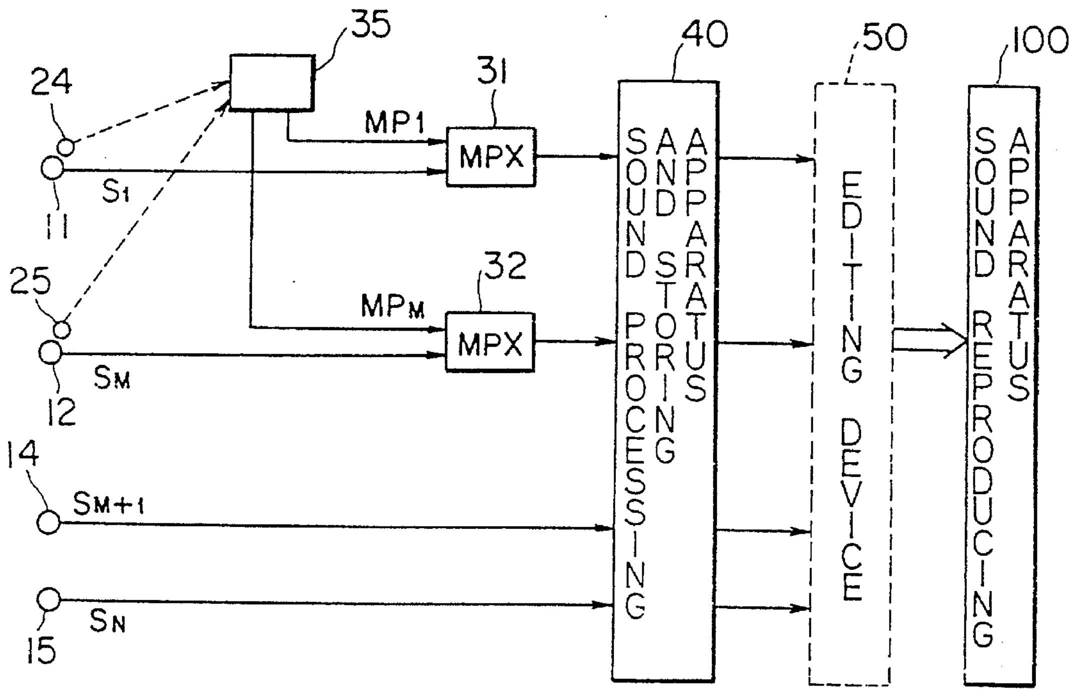
FIG. 4 is a block diagram of another sound collecting apparatus to which the present invention is applied.

Referring now to FIG. 4, there is shown another sound collecting apparatus to which the present invention is applied. The present sound collecting apparatus particularly exhibits a construction which is applied to recording when a sound source moves. As an example of a sound source which moves, there is such a case wherein a singer having a microphone sings while moving on a stage.

In collection of sound when a singer having a first microphone 11 is moving in this manner, it is preferable to detect the position of the singer using a first position detecting apparatus 21 of the wireless type.

It is to be noted that the first microphone 11 is not fixed in the proximity of the piano 1 as shown in FIG. 1 but is grasped by the singer. Further, an Mth microphone 12 is grasped by another singer who also is moving.

A sound from a piano not shown is detected by an M+1th microphone 14 while a sound from a violin not shown is detected by an Nth microphone 15.

Ultrasonic waves may be radiated from the first position detecting apparatus 21 integrated with the first microphone 11 which is grasped by the singer who is moving. Several ultrasonic wave receiving apparatus may be disposed at various locations in a concert hall 5 and receive the ultrasonic waves. The ultrasonic wave receiving apparatus notify a microphone position detecting apparatus 35 of the ultrasonic waves by way of radio waves or like means. The microphone position detecting apparatus 35 detects the radio waves to detect the position of the first microphone 11.

Similarly, ultrasonic waves may be radiated also from an Mth position detecting apparatus 25 integrated with the Mth microphone 12 so that the position of the Mth microphone 12 can be detected by way of the microphone position detecting apparatus 35.

For position detection at the microphone position detecting apparatus 35, other methods may be taken such as the method wherein radio waves are radiated from the first position detecting apparatus 21 so that the position of the first position detecting apparatus 21 is standardized from magnitudes of received radio waves at two or more positions spaced from one another.

In the present sound collecting apparatus, the positions of the musical instruments such as the piano and the violin not shown in FIG. 4 are fixed. Accordingly, the positions of the musical instruments are stored as fixed position information in advance in the collected sound signal processing and storing apparatus 40, and a microphone position information detection signal MP1 from the microphone position detecting apparatus 35 representative of the position of the first microphone 11 grasped by a singer who is moving and a microphone detected sound signal S1 from the first microphone 11 are multiplexed by a first multiplexer 31 or the collected sound signal processing and storing apparatus 40.

In this instance, as described hereinabove with reference to FIG. 1, microphone detected sound signals SM+1 and SN from the (M+1)th microphone 14 and the Nth microphone 15 are not multiplexed. Multiplexing at the first multiplexer 31 and the second multiplexer 32 or the collected sound signal processing and storing apparatus 40 is similar to that in the sound collecting apparatus described hereinabove with reference to FIG. 1.

Further, also in the present sound collecting apparatus, information of dimensions or sizes of sound sources such as a singer, the piano and the violin and directivities of the microphones or those sound sources are additionally multiplexed with microphone detected sound signals S.

Figure 5:
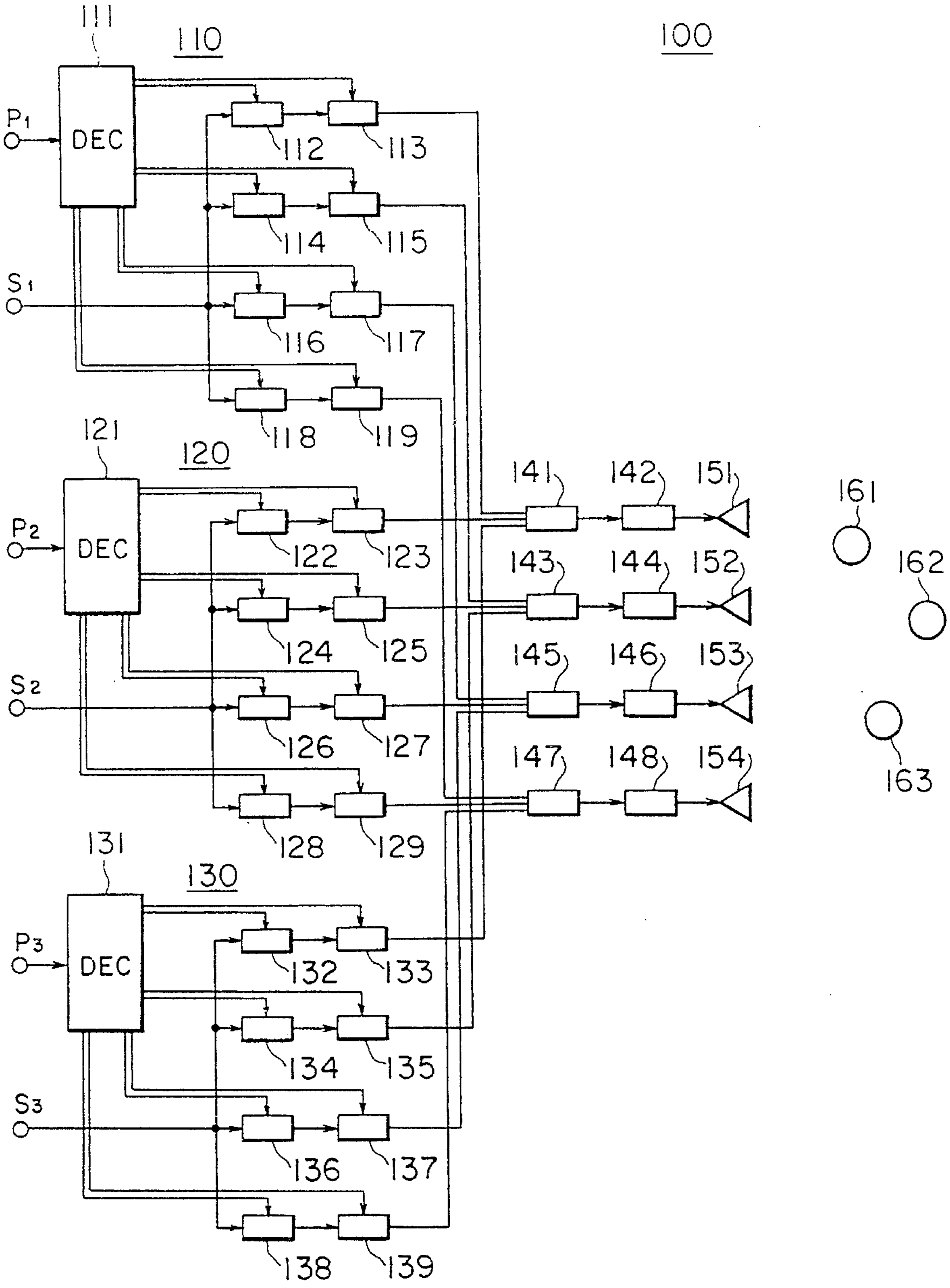
FIG. 5 is a block diagram of a sound reproducing apparatus to which the present invention is applied.

Referring now to FIG. 5, there is shown a sound reproducing apparatus to which the present invention is applied. The present sound reproducing apparatus 100 is constructed to reproduce sound multiplexed and recorded by the sound collecting apparatus shown in FIG. 1 or 4 and includes a first sound reproducing circuit 110, a second sound reproducing circuit 120 and a third sound reproducing circuit 130, and a loudspeaker system 140.

While description has been given, in the sound collecting systems described hereinabove, of the case wherein there are N audio channels, FIG. 5 shows only four independent channels for the convenience of illustration.

The first sound reproducing circuit 110 includes a decoder 111, and four parallel systems of sound adjusting circuits which are individually constituted from a signal delaying circuit 112 and an amplitude adjusting circuit 113, another signal delaying circuit 114 and another amplitude adjusting circuit 115, a further signal delaying circuit 116 and a further amplitude adjusting circuit 117, and a still further signal delaying circuit 118 and a still further amplitude adjusting circuit 119.

Also the circuit constructions of the second sound reproducing circuit 120 and the third sound reproducing circuit 130 are similar to that of the first sound reproducing circuit 110.

The loudspeaker system 140 includes a signal adding circuit 141, a power amplifying circuit 142 and a loudspeaker 151, another signal adding circuit 143, another power amplifying circuit 144 and another loudspeaker 152, a further signal adding circuit 145, a further power amplifying circuit 146 and a further loudspeaker 153, and a still further signal adding circuit 147, a still further power amplifying circuit 148 and a still further loudspeaker 154.

At stages preceding to the first sound reproducing circuit 110, the second sound reproducing circuit 120 and the third sound reproducing circuit 130, signal reading out and demultiplexing circuits which demultiplex audio signals and position signals multiplexed for individual audio channels onto storage media by the collected sound signal processing and storing apparatus 40 illustrated in FIG. 1 described above to produce position information detection signals P1, P2 and P3 and microphone detected sound signals S1, S2 and S3 which are independent of one another are provided. However, such signal reading out and demultiplexing circuits are not shown in the drawings.

Or, when a multiplexed signal is to be applied from the collected sound signal processing and storing apparatus 40 shown in FIG. 1 directly to the sound reproducing apparatus 100, only a circuit for demultiplexing the multiplexed signal must be provided.

Or otherwise, a sound collecting system and a sound reproducing system of the present invention may be constructed integrally. In this instance, the signals of the first microphone 11 and the Mth microphone 12 and the signals of the first position detecting apparatus 21 and the Mth position detecting apparatus 22 can be used directly without multiplexing them.

In the following description, description will be given of how position information and microphone detected sound signals read out and demultiplexed are used for reproduction.

Figure 6A:
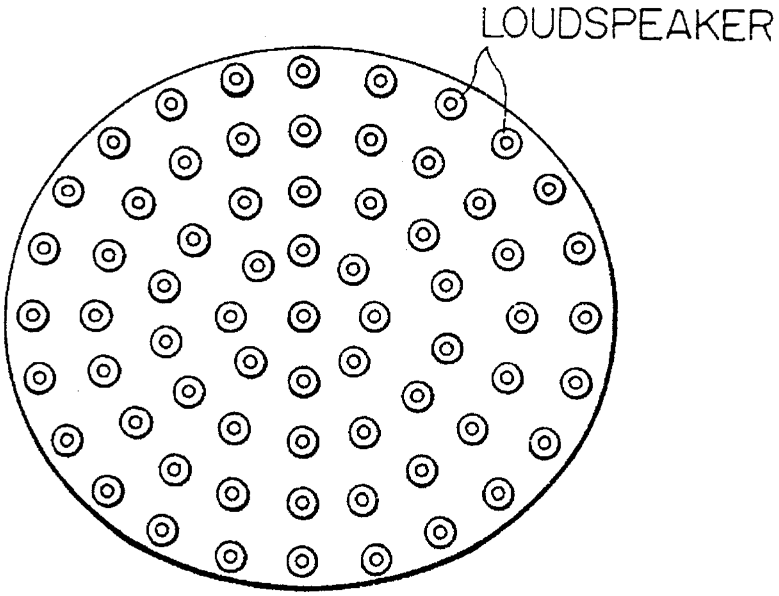
FIGS. 6A and 6B are a front elevational view and a schematic view, respectively, showing an arrangement of a plurality of loudspeakers of the sound reproducing apparatus shown in FIG. 5.
Figure 6B:
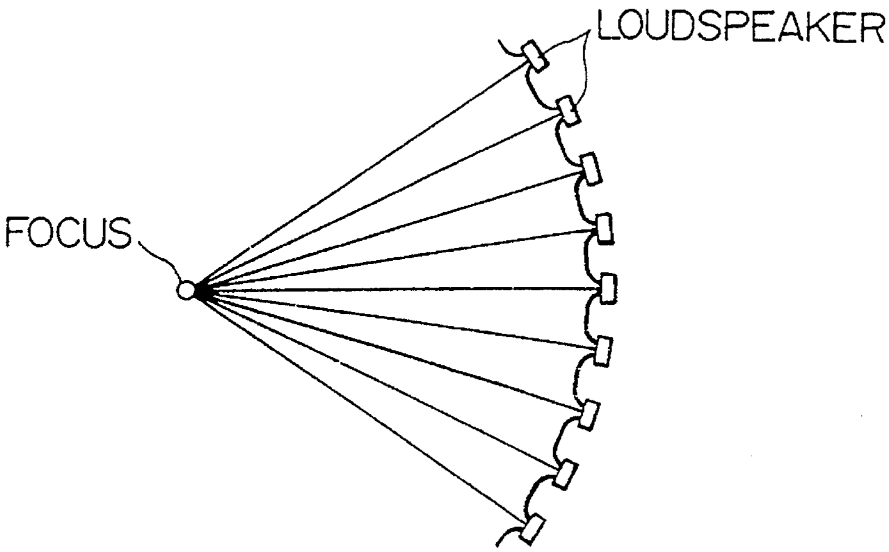

An exemplary arrangement of the loudspeakers of the loudspeaker system 140 shown in FIG. 5 is shown in FIGS. 6A and 6B. In the arrangement of the loudspeaker system 140 shown, the M loudspeakers are arranged in a concave plane.

The arrangement itself of the loudspeakers has been proposed by Olson and is disclosed, for example, in Olson, translated by Nishimaki, "Acoustic Engineering", first volume, 1959.

The loudspeaker system by Olson is based on the foundation that, if a large number of loudspeakers are arranged in an array and the delay amounts of signals to be applied are adjusted so that a focus of acoustic waves is formed at a point of the space, then a point at which the acoustic pressure is very high is synthesized at a point in the proximity of the listener, and a situation as if an actual sound source is present at the point appears and an audio image is perceived at the position also in a psychologically auditory sense (for example, Komiyama et al., "Development of Far and Near Control Technology of Audio Image for Three-Dimensional Television", NHK Technical Institute R & D, February, 1991, No. 2, pp.10–14).

While the only four loudspeakers 151 to 154 are shown in FIG. 5, generally speaking, M loudspeakers are disposed as shown in FIG. 6.

Referring back to FIG. 5, the decoder 111 varies the delay amounts of the signal delaying circuits 112,114,116 and 118, to which the microphone detected sound signal S1 is applied, from an actual position information detecting signal P1 multiplexed and inputted to the decoder 111. Further, the decoder 111 adjusts the amplitudes of the microphone detected sound signals delayed by the signal delaying circuits 112,114,116 and 118 at the amplitude adjusting circuits 113,115, 117 and 119.

The delay amount at the signal delaying circuit 112 by position information is determined in accordance with the position of the sound source and/or the location of the microphone. It is defined in accordance with subjects, conditions, an object and so forth of sound collection and reproduction how to use the position information of the sound source and the position information of the microphone.

If sound reproducing processing is performed using actual position information in this manner, then reproduced acoustic sound regions 161, 162 and 163 are produced at positions corresponding to the positions at which actual audio images are present.

When also a dimension of a sound source is multiplexed in the sound collecting apparatus described hereinabove, the decoder 111 varies the amounts of adjustment in amplitude at the amplitude adjusting circuits 113, 115, 117 and 119 individually in accordance with the dimension of the sound source and, when necessary, taking also position information into consideration.

Consequently, a further accurate actual audio image can be produced.

Similarly, when a directivity is multiplexed by the sound collecting apparatus, the decoder 111 calculates a delay amount and an amplitude adjustment amount based on the directivity and adjusts the signal delaying circuits 112, 114,116 and 114 and the amplitude adjusting circuits 113, 115, 117 and 119 in accordance with the delay amount and the amplitude adjustment amount thus calculated.

While, in the sound reproducing method described above, the case wherein the delay amount and the amplitude amount are adjusted independently for each audio channel has been described, in the present invention, the delay amounts of the individual signal delaying circuits and the amplitude adjustment amounts of the amplitude adjusting circuits in the sound reproducing circuits 110, 120 and 130 are defined from the general point of view of sound reproduction adding an audio signal and position information of each channel and besides a magnitude, a directivity and so forth of a sound source.

The general adjustment may be performed at the editing stage with the editing apparatus 50, or else, a coefficient may be calculated in accordance with position information, a dimension of a sound source and so forth in order to adjust the various systems in accordance with the coefficient.

Figure 7:
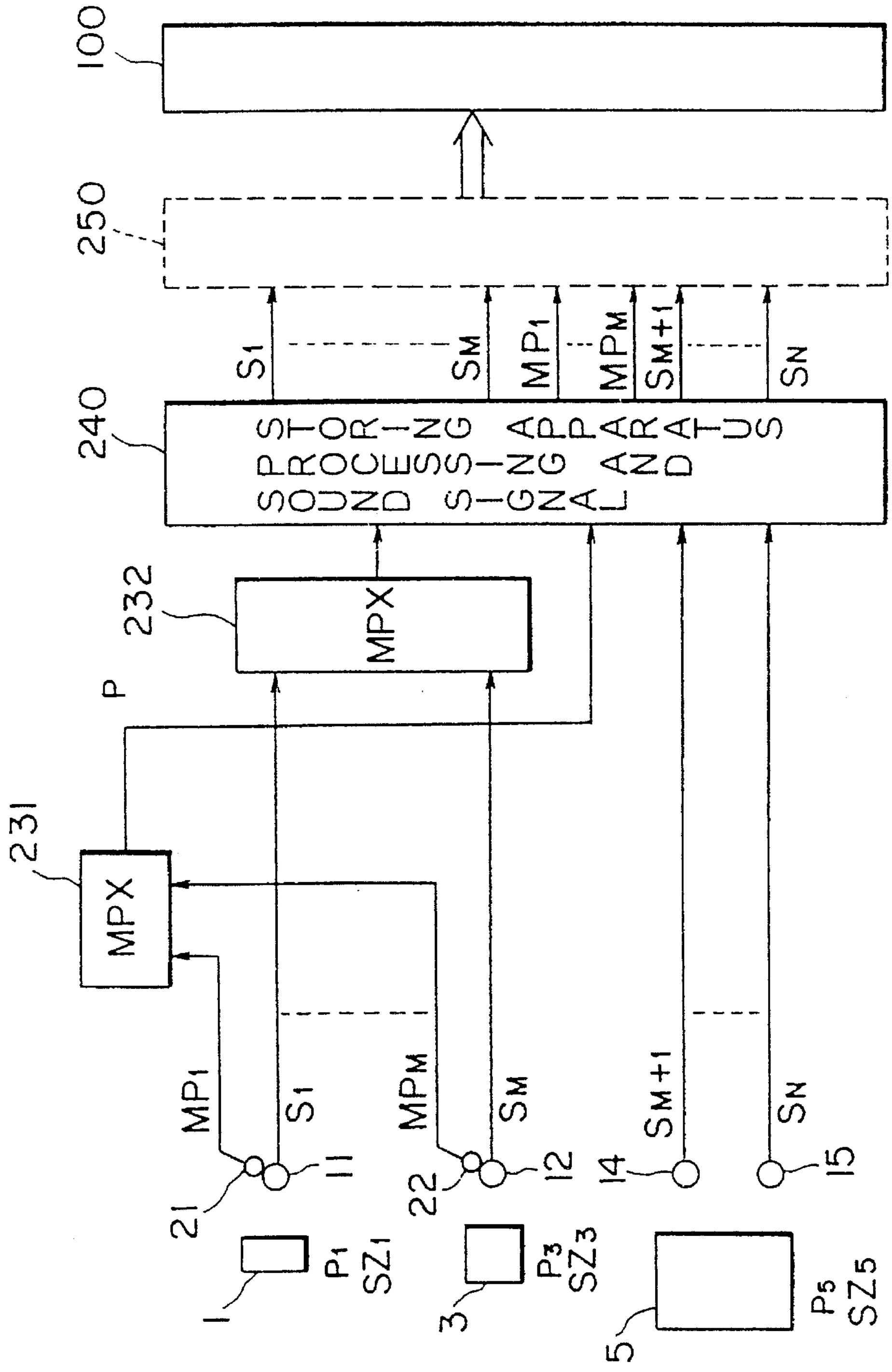
FIG. 7 is a block diagram of a further sound collecting apparatus to which the present invention is applied.

Referring now to FIG. 7, there is shown a further sound collecting apparatus to which the present invention is applied. The sound collecting apparatus shown in FIG. 7 collects sounds from various sound sources including sounds from a plurality of musical instruments such as a piano 1 and a plurality of violins (only one is shown in FIG. 7) 3 and sounds from the audience of a concert hole 5.

The sound collecting apparatus shown in FIG. 7 includes a first microphone 11 for detecting an acoustic sound from the piano 1, second to Mth microphones (only one is shown in FIG. 1) 12 for detecting acoustic sounds from the violins 3, and (M+1)th to Nth microphones 14 to 15 for detecting acoustic sounds from the hall 5.

The sound collecting apparatus further includes a first position detecting apparatus 21 for providing information representative of the position of the first microphone 11 and second to Mth position detecting apparatus (only one is shown in FIG. 7) 22 for providing information representative of the position of the second to Mth microphone 12.

The sound collecting apparatus further includes a first multiplexer 231, a second multiplexer 232 and a collected sound signal processing and storing apparatus 240.

The first microphone 11 is disposed in the proximity of the piano 1, detects an acoustic sound principally from the piano 1, and outputs the detected acoustic sound to the second multiplexer 232.

Similarly, the second to Mth microphones 12 are disposed in the proximity of the respective violins 3, detect acoustic sounds principally from the violins 3 and output the detected acoustic sounds to the second multiplexer 232.

The first position detecting apparatus 21 outputs information of the position of the piano 1, and the second to Mth position detecting apparatus 22 output information of the positions of the respective violins 3. The microphone position information detection signals MP1 to MPM are inputted to the first multiplexer 231.

The position information provided from the first position detecting apparatus 21 and the second to Mth position detecting apparatus 22 represents relative positions or absolute positions on a rectangular coordinate system wherein, for example, the position of the conductor in the concert hall 5 is set as the origin. However, the position information need not necessarily be represented in rectangular coordinates but may be represented in a polar coordinate system.

The musical instruments such as the piano 1 and the violins 3 in the concert hall 5 are normally disposed at fixed positions in the concert hall 5. Accordingly, in the present sound collecting apparatus, the first position detecting apparatus 21 and the second to Mth position detecting apparatus 22 provide fixed location signals of the piano 1 and the violins 3.

Position information of acoustic sounds from the audience in the concert hall 5 is set as position information of the entire hall 5 to the collected sound signal processing and storing apparatus 240.

The first multiplexer 231 multiplexes microphone position information detection signals from a microphone position information detection signal MP1 detected by the first microphone 11 to a microphone position information detection signal MPM detected by the Mth position detecting apparatus 22.

Similarly, the second multiplexer 232 multiplexes microphone detected sound signals S1 to SM from the first microphone 11 and the second to Mth microphones 12.

The thus multiplexed signals are inputted as input multiplexed signals IM1 and IM2 to the collected sound signal processing and storing apparatus 240 and then recorded at the positions corresponding to individual audio channels.

In this manner, microphone detected sound signals S and corresponding microphone position information detection signals MP are recorded in a multiplexed condition into different audio channels.

As a multiplexing method of audio signals and position signals by the first multiplexer 231 and the second multiplexer 32, respectively, it is performed, for example, by a frequency multiplexing method suitable for analog signal processing, a time division multiplexing method suitable for digital signal processing or the like.

Figure 8:
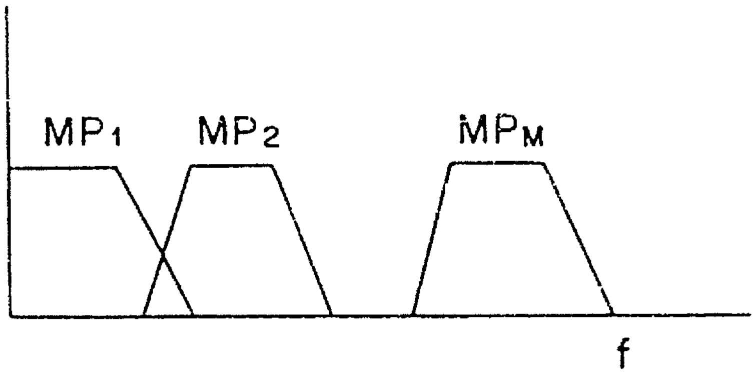
FIG. 8 is a diagram illustrating frequency multiplexing processing for an acoustic sound signal and position information by the sound collecting apparatus shown in FIG. 7.

A frequency multiplexing method will be described with reference to FIG. 8.

The microphone position information detection signal MP1 from the first position detecting apparatus 21 and the second to Mth microphone position information detection signals MP2 to MPM from the second to Mth position detecting apparatus 22 are frequency multiplexed in different frequency bands from one another.

Multiplexing of the position information is performed for a certain audio channel while multiplexing of the microphone detected sound signals S1 to SM is performed for another channel.

Where the multiplexing channel for position information and the multiplexing channel for sound signals are made different from each other, same frequency bands can be used independently of each other, and handling of signals in an editing operation and a reproducing operation, which will be performed later, is facilitated.

Figure 9:
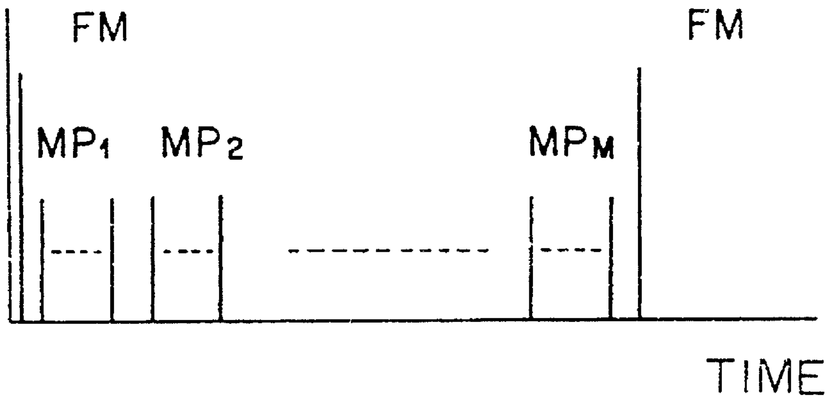
FIG. 9 is a diagram illustrating time base multiplexing processing for an acoustic sound signal and position information by the sound collecting apparatus shown in FIG. 7.

Time division multiplexing processing will be described with reference to FIG. 9. A plurality of microphone position information detection signals MP1 to MPM are time division multiplexed for a same channel. In FIG. 9, reference character FM denotes a frame marker.

Multiplexing of sound signals is performed in a similar manner as described hereinabove. However, as described hereinabove, multiplexing of position information and multiplexing of sound signals are performed using different channels from each other.

While time division multiplexing in which digital processing is performed is easy as multiplexing at the first multiplexer 231 and the second multiplexer 32, if also the factor of a price is taken into consideration, then it is rather difficult to perform frequency multiplexing individually on the first multiplexer 231 and the second multiplexer 232. Accordingly, when frequency multiplexing is to be performed, microphone detected sound signals S and microphone position information detection signals MP may be inputted once to the collected sound signal processing and storing apparatus 240 so as to frequency multiplex them in the collected sound signal processing and storing apparatus 240.

Or, time division multiplexing processing may be performed in the collected sound signal processing and storing apparatus 240.

Anyway, acoustic sound signals and corresponding position signals are multiplexed into different audio channels and outputted from the collected sound signal processing and storing apparatus 240.

The collected sound signal processing and storing apparatus 240 further receives microphone detected sound signals SM+1 to SN of the M+1th to Nth microphones 14 to 15 and outputs them as they are without multiplexing them.

When also dimensions of the sound sources are to be multiplexed, they are multiplexed similarly as the position information described above. In this instance, however, a channel different from the channel into which the sound signals are multiplexed is used. The channel may be the channel into which the position information is multiplexed or may alternatively be a new different channel.

Normally a position signal varies continuously and at a high rate. However, variations of position information and dimensions of sound sources are smaller than a variation of a sound signal. Accordingly, from the point of view of minimizing the number of channels to be used, a same channel may be used for multiplexing of position information and multiplexing of dimensions of sound sources. On the other hand, from the point of view of facilitating signal processing, it is preferable to multiplex dimensions of sound sources into a channel different from the channel into which position information is multiplexed.

Also when directivities are to be multiplexed, they are multiplexed into a channel different from the channel for sound signals similarly as in multiplexing of dimensions of sound sources. The directivities may be multiplexed into a channel identical with or different from the channel into which position information is multiplexed, similarly as described above.

Further, in FIG. 7, from the frequency characteristics of the microphone detected sound signals S1 to SM from the first microphone 11 and the second to Mth microphones 12, the microphone detected sound signals S may not be multiplexed but may be stored into different audio channels without multiplexing them, similarly as the microphone detected sound signals from the M+1th to Nth microphones 14 to 15.

In this instance, position information and so forth are multiplexed and stored in a corresponding relationship in time to the storage of sound signals using a channel or channels different from the audio channel for the sound signals.

It is to be noted that the configuration of the present sound collecting system can naturally be applied to the sound collecting apparatus described hereinabove with reference to FIG. 4.

Having now fully described the invention, it will be apparent to one of ordinary skill in the art that many changes and modifications can be made thereto without departing from the spirit and scope of the invention as set forth herein.

What is claimed is:

1. A sound reproducing system, comprising:

reading out means for reading out audio signals and position signals from a plurality of independent audio channels, said audio channels having said audio signals as well as said position signals recorded in a multiplexed condition thereon, wherein said position signals represent at least original positions of sound sources of said audio signals upon the recording of said audio signals, or represent original positions of sound detecting means which have been used to detect sounds from said sound sources and to produce said audio signals;

adjusting means for synthetically adjusting amplitudes and delay times of said audio signals read out by said reading out means in order to produce an actual audio image in accordance with said position signals read out by said reading out means; and, loudspeaker means for outputting as acoustic sound, said audio signals adjusted by said adjusting means.

2. The sound reproduction system of claim 1, wherein said reading out means further reads out from said audio channels, dimension signals representing a dimension of said sound sources, said dimension signals being recorded in a multiplexed condition with said audio signals and said position signals and wherein said adjusting means synthetically adjusts said amplitude and said delay time further in accordance with said dimension signals read out by said reading out mean.

3. A sound reproducing method, comprising the steps of:

reading out audio signals and position signals from a plurality of independent audio channels, said audio channels having said audio signals as well as said position signals recorded thereon, wherein said position signals represent at least original positions of sound sources of said audio signals upon the recording of said audio signals, or represent original positions of sound detecting means which have been used to detect sounds from said sound sources and to produce said audio signals;

synthetically adjusting amplitudes and delay times of said audio signals thus read out in order to produce an actual audio image in accordance with said position signals thus read out; and outputting said audio signals thus adjusted as acoustic sound.

4. A sound reproducing system, comprising:

reading out means for reading out audio signals from a first channel on which said audio signals are recorded in a multiplexed condition, and for reading out position signals from a second channel on which said position signals are recorded in a multiplexed condition, wherein said position signals represent at least original positions of sound sources of said audio signals upon the recording of said audio signals, or represent original positions of sound detecting means which have been used to detect sounds from said sound sources and to produce said audio signals;

adjusting means for synthetically adjusting amplitudes and delay times of said audio signals read out by said reading out means in order to produce an actual audio image in accordance with said position signals read out by said reading out means; and, loudspeaker means for outputting as acoustic sound, said audio signals adjusted by said adjusting means.

5. A sound reproducing system, comprising:

reading means for reading out audio signals from a first channel on which said audio signals are recorded in a multiplexed condition, and for reading out from a second channel, position signals and dimension signals recorded in a multiplexed condition thereon, wherein said position signals represent at least original positions of sound sources of said audio signals upon the recording of said audio signals, or represent original positions of sound detecting means which have been used to detect sounds from said sound sources and to produce said audio signals, and said dimension signals represent dimensions of said sound sources;

adjusting means for synthetically adjusting amplitudes and delay times of said audio signals read out by said reading out means in order to produce an actual audio image in accordance with said position signals and said dimension signals read out by said reading out means; and loudspeaker means for outputting as acoustic sound, said audio signals adjusted by said adjusting means.

6. A sound reproducing system, comprising:

reading out means tier reading out audio signals, position signals, dimension signals and directivity signals from a plurality of independent audio channels, said audio channels having said audio signals, said position signals, said dimension signals and said directivity signals recorded in a multiplexed condition thereon, wherein said position signals represent at least original positions of sound sources of said audio signals upon the recording of said audio signals or represent original positions of sound detecting means which have been used to detect sounds from said sound sources and to produce said audio signals, said dimension signals represent dimensions of said sound sources and said directivity signals represent directivities of said sound sources;

adjusting means for synthetically adjusting amplitudes and delay times of said audio signals read out by said reading out means in order to produce an actual audio image in accordance with said position signals, said dimension signals and said directivity signals read out by said reading out means; and, loudspeaker means for outputting as acoustic sound, said audio signals adjusted by said adjusting means.

7. A sound reproducing system, comprising:

reading means for reading out audio signals from a first channel on which said audio signals are recorded in a multiplexed condition, and for reading out a second channel, position signals, dimension signals and directivity signals recorded in a multiplexed condition thereon, wherein said position signals represent at least original positions of sound sources of said audio signals upon the recording of said audio signals or represent original positions of sound detecting means which have been used to detect sounds from said sound sources and to produce said audio signals, said dimension signals represent dimensions of said sound sources and said directivity signals represent directivities of said sound sources;

adjusting means for synthetically adjusting amplitudes and delay times of said audio signals read out by said reading out means in order to produce an actual audio image in accordance with said position signals, said dimension signals and said directivity signals read out by said reading out means; and loudspeaker means for outputting as acoustic sound, said audio signals adjusted by said adjusting means.

8. A sound reproducing system, comprising:

reading out means for reading out audio signals, position signals and directivity signals from a plurality of independent audio channels, said audio channels having said audio signals, said position signals and said directivity signals recorded in a multiplexed condition thereon, wherein said position signals represent at least original positions of sound sources of said audio signals upon the recording of said audio signals or represent original positions of sound detecting means which have been used to detect sounds from said sound sources and to produce said audio signals and wherein said directivity signals represent directivities of said sound sources;

adjusting means for synthetically adjusting amplitudes and delay times of said audio signals read out by said reading out means in order to produce an actual audio image in accordance with said position signals and said directivity signals read out by said reading out means; and, loudspeaker means for outputting as acoustic sound, said audio signals adjusted by said adjusting means.

9. A sound reproducing system, comprising:

reading means for reading out audio signals from a first channel on which said audio signals are recorded in a multiplexed condition, and for reading out from a second channel, position signals and directivity signals recorded in a multiplexed condition thereon, wherein said position signals represent at least original positions of sound sources of said audio signals upon the recording of said audio signals or represent original positions of sound detecting means which have been used to detect sounds from said sound sources and to produce said audio signals and wherein said directivity signals represent directivities of said sound sources;

adjusting means for synthetically adjusting amplitudes and delay times of said audio signals read out by said reading out means in order to produce an actual audio image in accordance with said position signals and said directivity signals read out by said reading out means; and loudspeaker means for outputting as acoustic sound, said audio signals adjusted by said adjusting means.

* * * * *